United States Patent
Caution et al.

(10) Patent No.: US 10,417,891 B2
(45) Date of Patent: Sep. 17, 2019

(54) DETECTING FRAUDULENTLY DEACTIVATED SECURITY DEVICES FOR ASSET PROTECTION

(71) Applicant: Walmart Apollo, LLC, Bentonville, AR (US)

(72) Inventors: Stephen Tyler Caution, Bentonville, AR (US); Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/021,802

(22) Filed: Jun. 28, 2018

(65) Prior Publication Data

US 2019/0019385 A1     Jan. 17, 2019

Related U.S. Application Data

(60) Provisional application No. 62/531,678, filed on Jul. 12, 2017.

(51) Int. Cl.
G08B 13/24 (2006.01)
G06Q 20/20 (2012.01)

(52) U.S. Cl.
CPC ......... G08B 13/246 (2013.01); G06Q 20/203 (2013.01); G06Q 20/208 (2013.01); G08B 13/248 (2013.01); G08B 13/2411 (2013.01)

(58) Field of Classification Search
CPC .. G08B 13/246; G08B 13/248; G06Q 20/208; G06Q 20/203; G06Q 20/20

(Continued)

(56) References Cited

U.S. PATENT DOCUMENTS

| 5,494,136 A | * | 2/1996 | Humble | G07G 1/0054 |
| | | | | 186/61 |
| 5,640,002 A | * | 6/1997 | Ruppert | G06K 7/0008 |
| | | | | 235/383 |

(Continued)

FOREIGN PATENT DOCUMENTS

EP     3100648 A1     12/2016

OTHER PUBLICATIONS

Coulombe, Ray. "Laser Tag." Comtrol Corp, Jan. 13, 2017, 2 pages; http://blog.comtrol.com/2012/08/23/lasertag/.

(Continued)

*Primary Examiner* — John A Tweel, Jr.
(74) *Attorney, Agent, or Firm* — Schmeiser, Olsen & Watts, LLP; Jason A. Murphy

(57) ABSTRACT

An asset protection system and method may include detecting that a first item includes a first security device coupled to the first item, in response to the first item being scanned by the user, instructing the user to deactivate the first security device and then place the first item into a bagging area, wherein a deactivator is located at the point of sale computer terminal to deactivate the first security device, directing a detection source to scan the bagging area after the first item and other items have been placed into the bagging area, and determining based on the scanning by the detection source, that a second security device coupled to the at least one item other than the first item in the bagging area has been deactivated, but the at least one item has not been scanned by the user at the point of sale computer terminal.

24 Claims, 9 Drawing Sheets

(58) Field of Classification Search
USPC .................................................. 340/572.1
See application file for complete search history.

(56) References Cited

U.S. PATENT DOCUMENTS

| | | | |
|---|---|---|---|
| 5,747,784 A * | 5/1998 | Walter | A47F 9/048 |
| | | | 235/383 |
| 5,952,642 A * | 9/1999 | Lutz | G07G 3/003 |
| | | | 235/383 |
| 6,497,361 B1 | 12/2002 | Mason | |
| 6,693,539 B2 | 2/2004 | Bowers et al. | |
| 6,788,205 B1 | 9/2004 | Mason et al. | |
| 6,837,428 B2 | 1/2005 | Lee et al. | |
| 7,081,818 B2 | 7/2006 | Eckstein et al. | |
| 7,389,918 B2 | 6/2008 | Wike, Jr. et al. | |
| 7,672,871 B2 | 3/2010 | Brenhouse | |
| 8,113,427 B2 | 2/2012 | Ross et al. | |
| 8,448,858 B1 | 5/2013 | Kundu et al. | |
| 8,452,660 B2 * | 5/2013 | Morris | A47F 9/047 |
| | | | 235/383 |
| 8,830,060 B2 | 9/2014 | Pikkarainen et al. | |
| 8,976,030 B2 | 3/2015 | Cunningham et al. | |
| 10,081,496 B2 * | 9/2018 | Bacallao | G07G 1/0072 |
| 2003/0121974 A1 * | 7/2003 | Blanford | G01G 19/4144 |
| | | | 235/383 |
| 2010/0140351 A1 | 6/2010 | Trenciansky | |
| 2017/0046707 A1 | 2/2017 | Krause et al. | |
| 2018/0096567 A1 * | 4/2018 | Farrow | G07G 1/0009 |

OTHER PUBLICATIONS

Sudeep Sinha, Know the Mind-Blowing Technology Behind Amazon GO; GIZEST; Jan. 6, 2017, 7 pages; http://www.gizest.com/amazongotechnology/.

"Sweethearting Detection." Stoplift Checkout Vision Systems; Jan. 6, 2017, 2 pages; http://www.stoplift.com/technology/sweetheartingdetection/.

"LibBest Library RFID System in Action." May 1, 2010; 1 page; https://www.youtube.com/watch?v=MwCIF5BHIzY [Jun. 27, 2018 12:40:23 PM].

* cited by examiner

DETECTING FRAUDULENTLY DEACTIVATED SECURITY DEVICES FOR ASSET PROTECTION

CROSS-REFERENCE TO RELATED APPLICATIONS

This application claims priority to U.S. Provisional Application No. 62/531,678, having a filing date of Jul. 12, 2017, the entire contents of which are hereby incorporated by reference.

TECHNICAL FIELD

The present invention relates to systems and methods of asset protection, and more specifically to embodiments of an asset protection system for protecting assets using a detection source for detecting fraudulently deactivated security devices.

BACKGROUND

Many retailers offer a self-checkout option for users purchasing store items. Some store items contain a security device associated with the item to deter or prevent shoplifting of the item. The security device must be deactivated prior to exiting the store or an alarm may be triggered as the activated security tag is detected at the exit. In some cases, the security device is deactivated without the item being purchased.

SUMMARY

An embodiment of the present invention relates to a method, and associated computer system and computer program product, for asset protection. A processor of a computing system initiates a checkout process at a point of sale computer terminal, in response to an input by a user. A first item that includes a first security device coupled to the first item is detected, in response to the first item being scanned by the user at the point of sale computer terminal. The user is instructed to deactivate the first security device and then place the first item into a bagging area, wherein a deactivator located at the point of sale computer terminal to deactivate the first security device. A detection source is directed to scan the bagging area after the first item and other items have been placed into the bagging area. Based on the scanning by the detection source, it is determined that a second security device coupled to the at least one item other than the first item in the bagging area has been deactivated, but the at least one item has not been scanned by the user at the point of sale computer terminal.

DETAILED DESCRIPTION

Many store items are associated with a security device to prevent or deter shoplifting, especially more valuable items. To allow for a self-checkout option, a retailer must enable the deactivation of the security device at the point of sale. In some embodiments, a store representative may be called over to deactivate the security device associated with the store item, which requires a representative to be present at the time of the request to deactivate. In other embodiments, the user at a self-checkout terminal may be asked or instructed to deactivate the security device at the point of sale. Users may then deactivate the security device without intervention from a store representative, and exit the store without triggering an alarm proximate the exit. Shoplifters, however, may try to exploit the self-deactivation by attempting to deactivate more than one security device at a time, when only a single item has been scanned. For example, a first item with a security device may be scanned into the computer to prompt an instruction to deactivate the first item, but unbeknownst to the retailer, the shoplifter has placed a second item with a security device inside a packaging of the first item. Many times the deactivator is powerful enough to deactivate both security devices at the same time. Thus, the security device of the second item has been deactivated without being scanned into the point of sale computer and purchased, and the security checkpoint proximate the exit will not detect the second item's security device. In this case, the shoplifter may leave without paying for the second item.

Thus, there is a need for an asset protection system for protecting assets at a point of sale by detecting fraudulently deactivated security devices.

Figure 1:
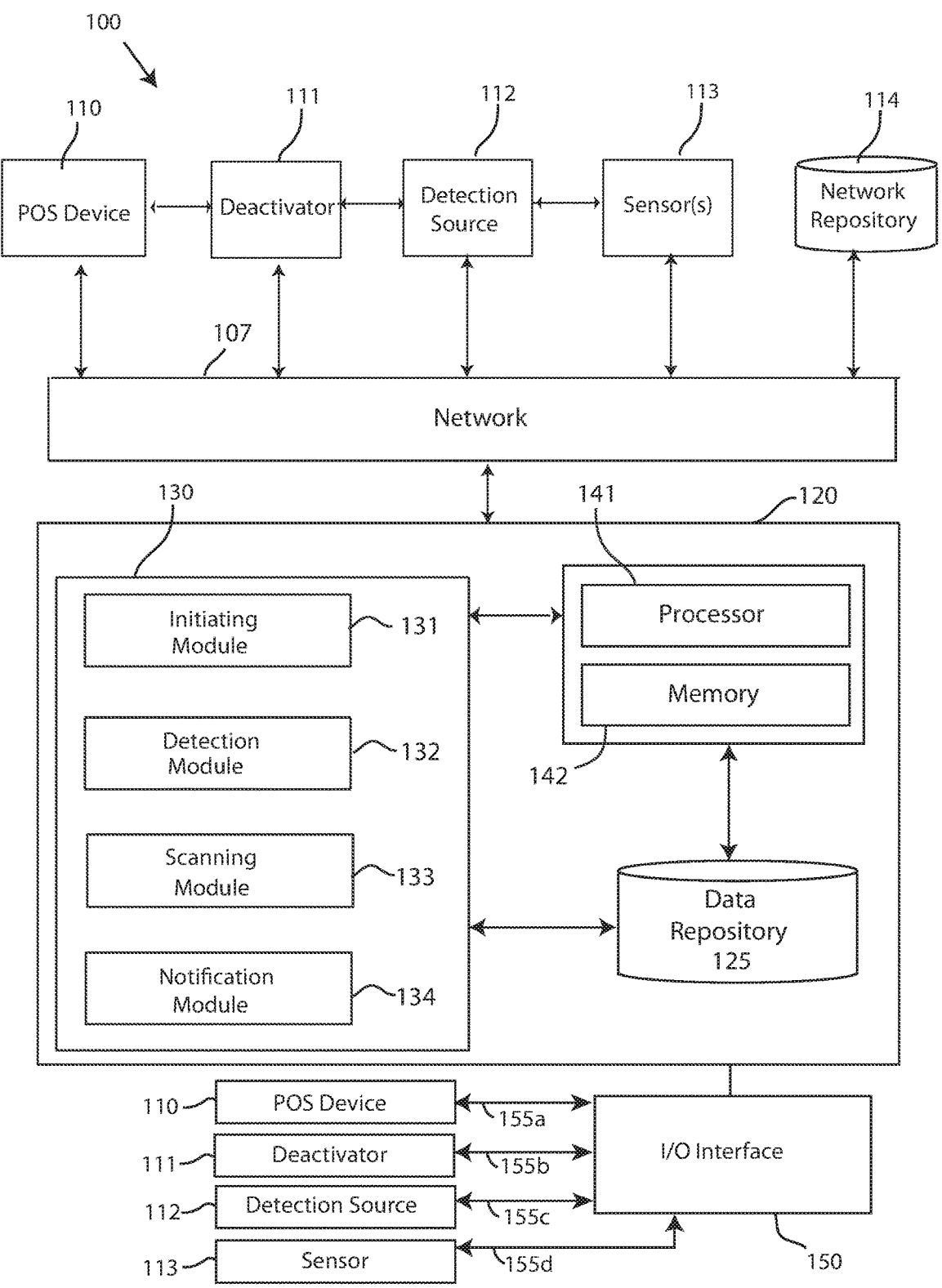
FIG. 1 depicts a block diagram of an asset protection system, in accordance with embodiments of the present invention.

Referring to the drawings, FIG. 1 depicts a block diagram of asset protection system 100, in accordance with embodiments of the present invention. Embodiments of the asset protection system 100 may be a system for protecting assets at a point of sale by detecting fraudulently deactivated security devices. Embodiments of the asset protection system 100 may be useful for retailers or any entity that may be interested in preventing, stopping, hindering, deterring, etc. shoplifting or an unauthorized taking of an object. Embodiments of the asset protection system 100 may be implemented at a self-checkout register, lane, terminal, and the like. Embodiments of the asset protection system 100 may also be implemented into "smart carts" that allow a customer to purchase goods by interacting with a user interface coupled to the shopping cart. Further, embodiments of the asset protection system 100 may be implemented at traditional registers with a store representative, in the event a smaller item is hidden from view or undetectable by the store representative. Embodiments of the asset protection system 100 may include a computing system 120. Embodiments of the computing system 120 may be a computer system, a computer, a server, one or more servers, a cloud computing device, a hardware device, a remote server, and the like.

Furthermore, embodiments of asset protection system 100 may include a point of sale (POS) device 110, a deactivator 111, a detection source 112, and a sensor 113, communicatively coupled to a computing system 120 of the asset protection system 100 over an I/O interface 150 and/or over a network 107. For instance, the POS device 110, the deactivator 111, the detection source 112, and the sensor 113 may be connected via an I/O interface 150 to computer system 120 via data bus lines 155a, 155b, 155c, 155d, respectively (referred to collectively as "data bus lines 155") and/or over network 107. As shown in FIG. 1, the POS device 110, the deactivator 111, the detection source 112, and the sensor 113 may transmit information/data to the computing system 120, via the data bus lines 155 to the I/O interface 150. An I/O interface 150 may refer to any communication process performed between the computer system 120 and the environment outside of the computer system 120, for example, the POS device 110, the deactivator 111, the detection source 112, and the sensor 113. Input to the computing system 120 may refer to the signals or instructions sent to the computing system 120, for example the data collected, detected, captured, etc. by sensor 113, while output may refer to the signals sent out from the computer system 120, such as a command to the deactivator 111 or detection source 112.

Alternatively, information/data may be transmitted to and received from the POS device 110, the deactivator 111, the detection source 112, and the sensor 113 over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114 containing information of the user, store items, security devices, and inventory management, network repositories or other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository may be a data center saving and cataloging user transaction data, security device deactivation information, purchased item information, and the like, to generate both historical and predictive reports regarding a particular user or a user's transaction, various items and the item's theft rate or attempted theft rate, and the like. In some embodiments, a data collection center housing the network repository 114 may include an analytic module capable of analyzing each piece of data being stored by the network repository 114. Further, the computing system 120 may be integrated with or as a part of the data collection center housing the network repository 114. In some alternative embodiments, the network repository 114 may be a local repository that is connected to the computing system 120.

Embodiments of the POS device 110 of the asset protection system 100 may include a point of sale computing device, a display, a monitor, a checkout computer, a device having a user interface for a user to select a self-checkout option and other options, and the like. Embodiments of the POS device 110 may be a cashier's register/computer terminal at a brick and mortal retail location, a computer terminal, a point of sale terminal, a handheld computer terminal, a computing device, a mobile device, or any device that can process or facilitate a purchase transaction at a point of sale. Embodiments of the POS device 110 may process payments from a customer, track orders, connect to other systems on a network, including a transactions records database, and send or receive communications to the computing system 120. In an exemplary embodiment, when a customer intends to checkout at a retailer, the customer may interact with the POS device 100.

Embodiments of the deactivator 111 of the asset protection system 100 may be a device for deactivating a security device associated with a store item. Embodiments of a security device may be a radio frequency identification (RFID) tag, RFID intelligent tag, a soft label, an electromagnetic strip, an acousto-magnetic strip, and the like. The security device may be associated with a given item, such as coupled to the item, adhered to the item, clipped to the item, glued to the item, integral with the packaging of the item, or otherwise linked with the item. Moreover, embodiments of the deactivator may be a deactivating device, radio frequency (RF) deactivator, an electronic article surveillance (EAS) deactivator, soft label deactivator, a security tag deactivator, a magnetic deactivator, a security alarm deactivator, and the like, which may deactivate, neutralize, disable, or otherwise nullify a security device associated with a store item. In an exemplary embodiment, the deactivator 111 may be a powerful magnet that may destroy or render inactive an electromagnetic security device, RFID tag, an acousto-magnetic strip and the like, when the security device is within a certain proximity of the magnetic field of the deactivator 111. In other embodiments, the deactivator 111 may be configured to destroy an integrated circuit within the security device. Further, embodiments of the deactivator 111 may be a pad or other surface that may be placed proximate the POS device 110 and emit a powerful magnetic field to disable or saturate the security device associated with the item.

Embodiments of the detection source 112 of the asset protection system 100 may be a source or radiation that can detect a presence of a deactivated security device. In an exemplary embodiment, the detection source 112 may be a device configured to emit terra hertz radiation. Terra hertz radiation may be electromagnetic waves within the ITU designated band of frequencies from 0.3 to 3 terahertz. Terra hertz radiation may also be referred to submillimeter waves, and may be omitted and detected at room temperature. In an alternative embodiment, the detection source 112 may be a device configured to emit a laser for lidar applications. Lidar may be pulsed laser light used for targeting an area (e.g. a bagging area or an area around the POS device 110).

Embodiments of the sensor 113 of the asset protection system 100 may be a sensor, a detector, a camera, mass spectrometer, spectrometer, filter(s), and the like, which may or may not be used in conjunction with the detection source 112. For instance, embodiments of the sensor 113 may be a sensor or camera that measures reflected pules of laser light from the lidar device 112. In other embodiments, the sensor 113 may be a terra hertz imaging camera or a terra hertz imaging scanner for detecting terra hertz radiation, for example, as the terra hertz radiation impinges on one or more store items and security devices.

Further, embodiments of the computing system 120 may be equipped with a memory device 142 which may store various transaction details, and a processor 141 for implementing the tasks associated with the asset protection system 100. In some embodiments, an asset protection application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the asset protection application 130. Embodiments of the asset protection application 130 may be an interface, an application, a program, a module, or a combination of modules. In an exemplary embodiment, the asset protection application 130 may be a software application running on one or more back end servers, servicing multiple computing devices. In other embodiments, the asset protection application 130 may be a software application running on a computer dedicated to a point of sale terminal, such as an integrated computing system housed within a checkout lane.

The asset protection application 130 of the computing system 120 may include an initiating module 131, a detection module 132, a scanning module 133, and a notification module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the initiation module 131 may include one or more components of hardware and/or software program code for initiating a checkout process at a point of sale computer terminal 110, in response to an input by a user. For example, the initiating module 131 may display one or more selections for a user to select on the POS device 110, including a "start" option for initiating a self-checkout process. In response to an input from the user (e.g. user selecting "start" option), the initiating module 131 may initiate or otherwise start a self-checkout process for the user to begin scanning items for purchase. Initiating the checkout process by the initiating module 131 may include instructing or prompting the user to begin scanning items for purchase.

Figure 2:
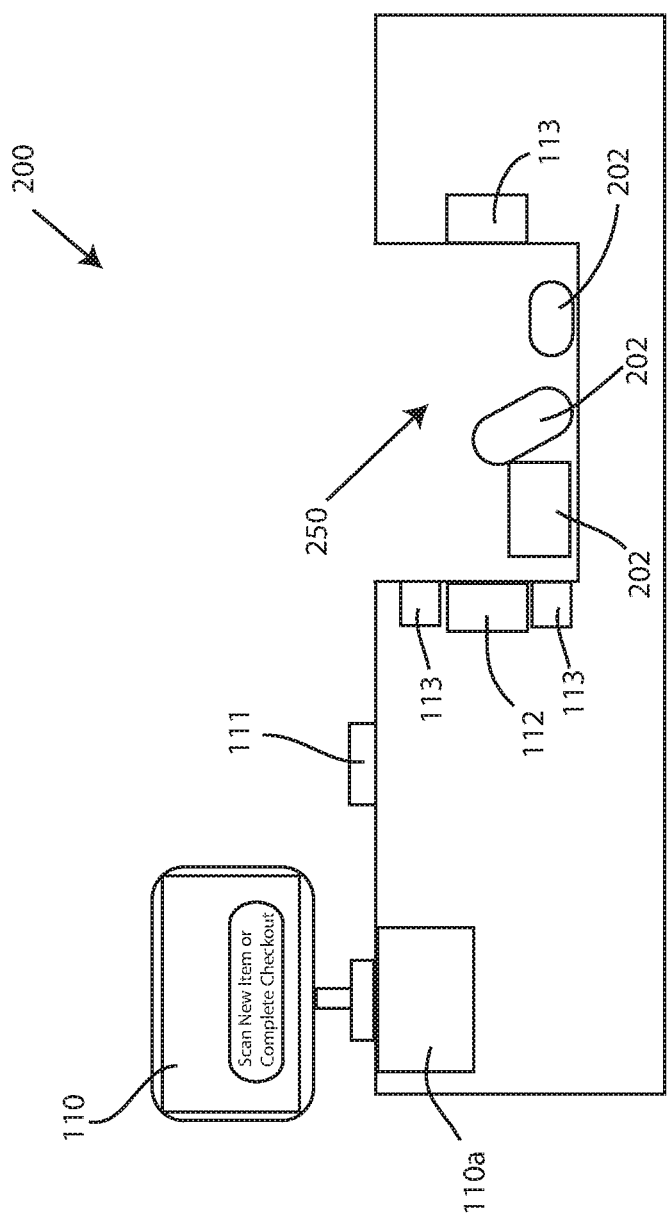
FIG. 2 depicts an embodiment of a point of sale location, in accordance with embodiments of the present invention.

FIG. 2 depicts a point of sale location 200, in accordance with embodiments of the present invention. The point of sale location 200 may be a self-checkout lane, a traditional register, or any location that includes the necessary hardware for facilitating a transaction for a user to purchase items. In an exemplary embodiment, the point of sale location 200 may include a bagging area 250. Embodiments of the bagging area 250 may be an area, a region, a space, a receiving area, a holding area, an item storing area, a receptacle, a cavity, and the like, configured to receive one or more store items that have been scanned by the user. For example, a user may scan an item without a security device (i.e. item 202) using scanner 110a, and then may place the item 202 into the bagging area 250 to proceed to scanning additional items. Further, embodiments of the point of sale location 200 may include a POS device 110, a deactivator 111 positioned proximate the POS device 111, and a detection source 112 and sensor 113 proximate the bagging area 250.

Embodiments of the computing system 120 may further include a detection module 132. Embodiments of the detection module 132 may include one or more components of hardware and/or software program code for detecting a security device 210 coupled to an item 215, in response to the item 215 being scanned by the user at the point of sale computer terminal 110. For instance, embodiments of the detection module 132 may determine that the item 215 scanned by the user over the scanner 110a includes a security device 210, unlike items 202 which do not contain a security device. The detection module 132 may communicate with the scanner 110a in response to the item 215 being scanned; the scanner 110a may capture unique identifiers of the item 215, such as UPC codes, bar codes, and the like, which indicate that the item 215 includes a security device 210. Other methods may be used to detect and/or determine that a scanned item 215 includes a security device 210. For instance, the detection module 132 may access a product information database over the network 107 to determine that the item 215 being scanned includes a security device 210. Additionally, the scanner 110a may include a detector to detect a RF signal or a presence of an integrated circuit associated with the item 215, and transmit such data to the detection module 132.

Figure 3:
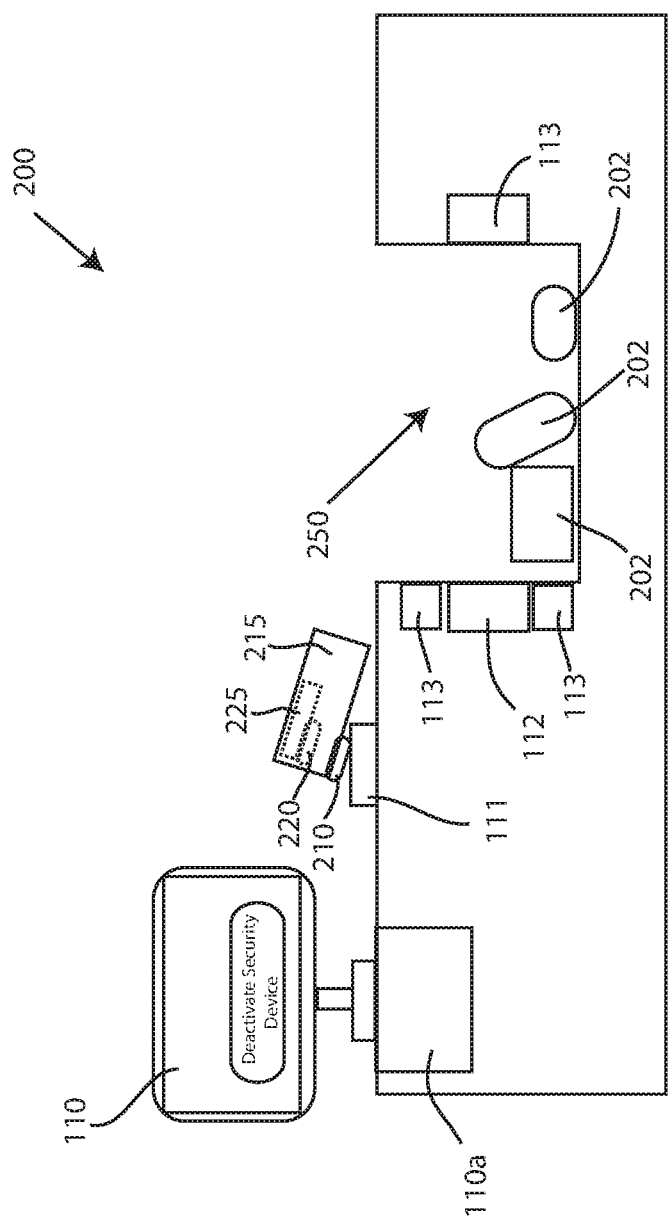
FIG. 3 depicts the point of sale location, wherein a hidden item with a security device is being deactivated at a same time as a security device of a scanned item, in accordance with embodiments of the present invention.

Furthermore, in response to the detection that the item 215 being scanned includes a security device 210, embodiments of the detection module 132 may instruct the user to deactivate the security device 210, and then place the item 215 into the bagging area 250. If the item 215 is only associated with a single security device 210, only the security device 210 may be deactivated. In this case, no shoplifting or fraud is being committed, and the user may continue the checkout process and exit the store as normal. However, in some instances, a shoplifter may attempt to exploit the self-deactivation process using the deactivator 111 located proximate the POS device 110 to deactivate more than one security devices 210, 220 at the same time. For instance, a first item 215 with a first security device 210 may be scanned with a second item 225 (e.g. a smaller and/or lighter item) placed within or otherwise concealed within or by a packaging of the first item 215. FIG. 3 depicts the point of sale location, wherein a hidden item 225 with a security device 220 is being deactivated at a same time as a security device 210 of a scanned item 215, in accordance with embodiments of the present invention. Here, only the first item 215 has been scanned into the system for payment, while the second item 225 is hidden within the first item 215. After scanning the first item 215 with the concealed second item 225, a potential shoplifter may use the deactivator 111 to deactivate both the first security device 210 and the second security device 220 at the same time, as shown in FIG. 3. Because the deactivator may be powerful enough to disarm, disable, deactivate, etc. both security devices 210, 220, a shoplifter could potentially exit the store without paying for the second item 215, and without triggering security alarms proximate the exit due to the deactive state of the second security device 220. For example, embodiments of a magnetic deactivator 111 may include a powerful magnet that can be capable of destroying both of the security devices 210, 220, especially given the proximity to the deactivator 111 when deactivating the security devices 210, 220 at the point of sale location 200.

Figure 4:
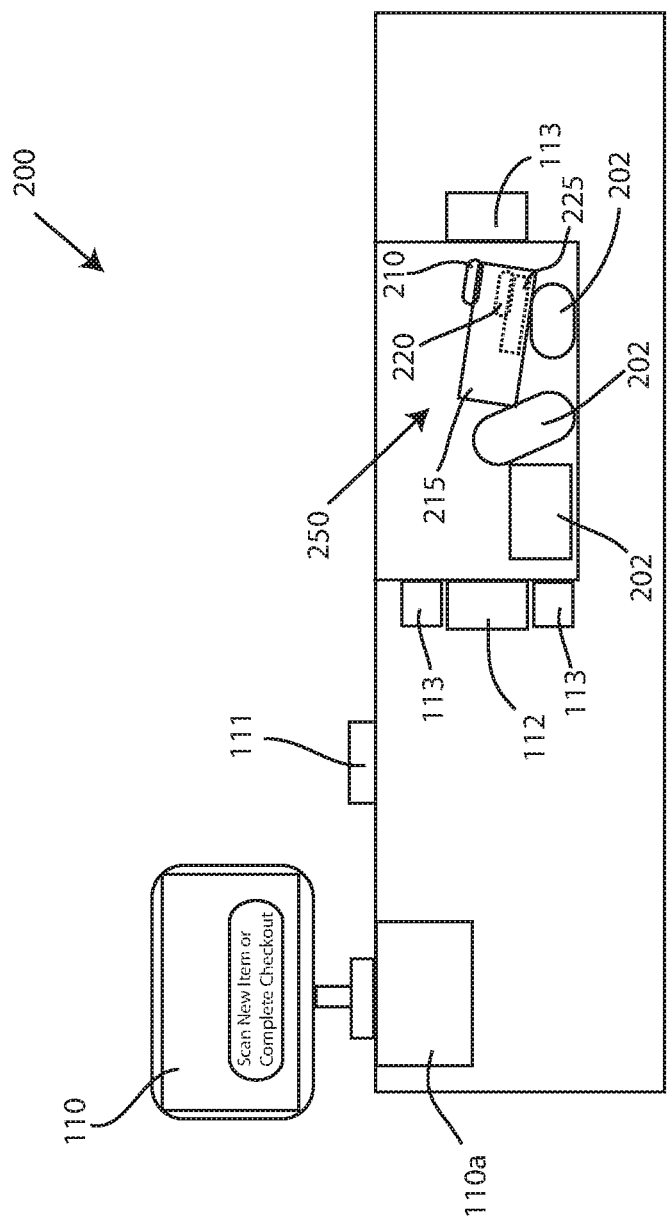
FIG. 4 depicts a fraudulently deactivated security device associated with an item not scanned, located within the bagging area of the point of sale location, in accordance with embodiments of the present invention.

FIG. 4 depicts a fraudulently deactivated security device 220 associated with an item 225 not scanned, located within the bagging area 250 of the point of sale location 200, in accordance with embodiments of the present invention. For instance, after the security devices 210, 220 of the first item 215 and the second item 225 have been deactivated, the item 215 may be placed into the bagging area 250.

Referring again to FIG. 1, embodiments of the computing system 120 may further include a scanning module 133. Embodiments of the scanning module 133 may include one or more components of hardware and/or software program code for directing a detection source 112 to (e.g. a lidar system emitting a pulsed laser or a terra hertz device emitting terra hertz radiation) to scan the bagging area 250 after the first item 215 (with the hidden item 225) and potentially other items 202 have been placed into the bagging area 250. The scanning module 133 may direct the detection source 112 to scan in response to a user inputting a selection into the user interface of the POS device 110 to "complete transaction" or the like. Alternatively, the scanning module 133 may direct the detection device 112 to scan after each item is scanned into the POS device 110. In another embodiment, the scanning may be continuously performed during the entire checkout process.

Figure 5:
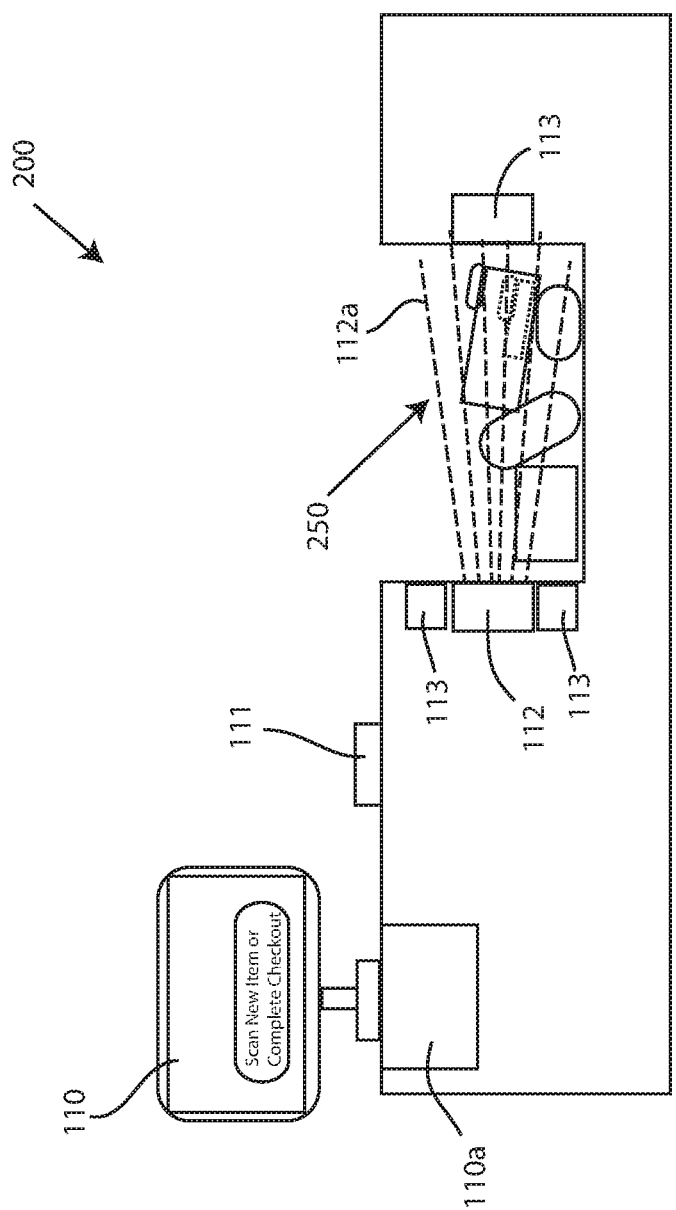
FIG. 5 depicts a detection source scanning the bagging area of the point of sale location, in accordance with embodiments of the present invention.
Figure 6:
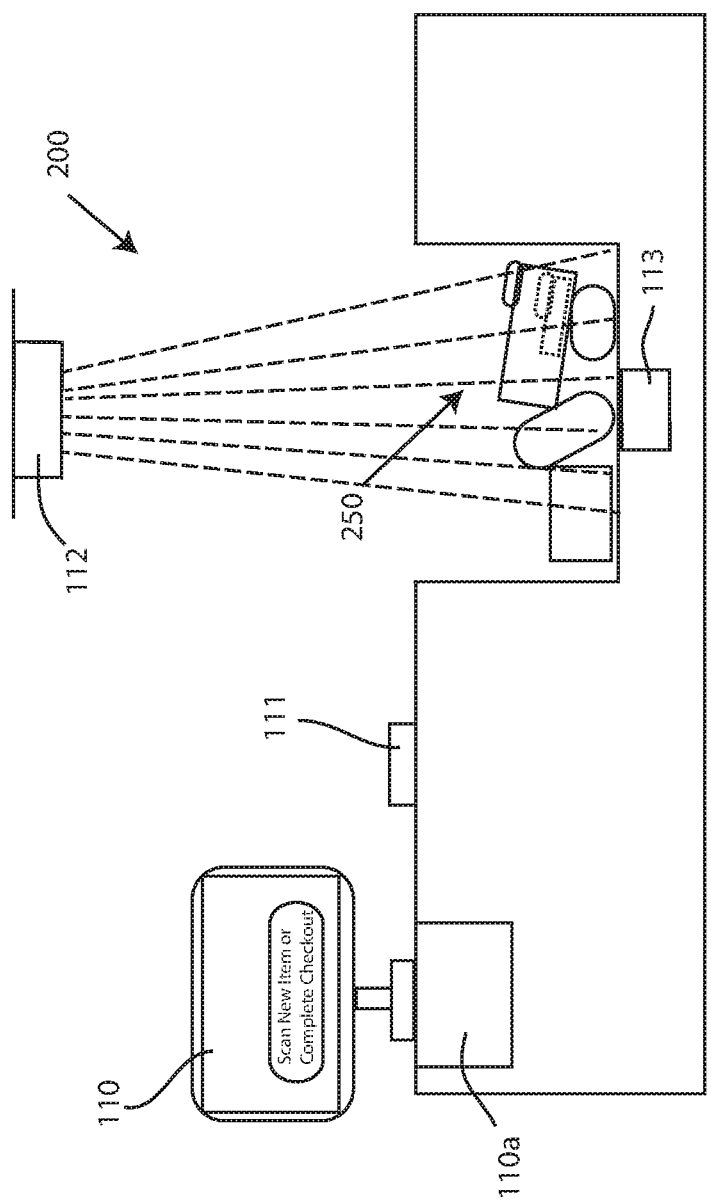
FIG. 6 depicts an alternative configuration of a remote detection source scanning the bagging area of the point of sale location, in accordance with embodiments of the present invention.

FIG. 5 depicts a detection source 112 scanning the bagging area 250 of the point of sale location 200, in accordance with embodiments of the present invention. The detection source 112 may be located proximate the bagging area 250. In an exemplary embodiment, the detection source may be flush with a wall or surface defining the bagging area 250. As shown in the drawings, the detection source 112 may be disposed on a side of the bagging area 250. The detection source 112 may emit, in a horizontal or substantially horizontal direction, a medium, a light, radiation, a pulsed laser, terra hertz radiation, a laser, or a wavelength of a particular frequency, etc. into the bagging area 250, as shown in FIG. 5. In an exemplary embodiment, the detection source 112 may be close to the bagging area 250, and disposed within a structure or wall defining the bagging area 250. Alternatively, the detection source 112 may be located remote from the bagging area 250. FIG. 6 depicts an alternative configuration of a remote detection source 112 scanning the bagging area 250 of the point of sale location 200, in accordance with embodiments of the present invention. As shown in FIG. 6, the detection source 112 may be located above the bagging area 250. The remote detection source 112 may be fastened to a ceiling structure, or may be located at a top of a pole proximate the bagging area 250. The remote detection source 112 may emit, in a vertical or substantially vertical direction, a medium, a light, radiation, a pulsed laser, terra hertz radiation, a laser, or a wavelength of a particular frequency, etc. into the bagging area 250, as shown in FIG. 6.

In further embodiments, the detection source 112 may include more than one detection source. A first detection source 112 may be located remotely while the second detection source may be disposed very near the bagging area 250 as part of or contained within a structure of the checkout lane. The more than one detection source 112 may all be the same type of detection, or may include a plurality of types of detection (e.g. each source being terra hertz emitter, each source being a lidar emitter, or both a terra hertz emitter and a lidar emitter).

Moreover, the detection source 112 may scan areas around the bagging area 250, such as an area around the POS device 110 to detect fraudulently deactivated security devices, associated with items not scanned in. For example, if a potential shoplifter destroys or deactivates a security device associated with an item, and then conceals that item on the shoplifter's persons and enters the checkout process to lawfully purchase a separate (e.g. less expensive) item to alleviate suspicion, the detection source 112 scanning an area surrounding the POS device 110 may detect the presence of the fraudulently deactivated security device associated with the concealed item.

Embodiments of the scanning module 133 may further include one or more components of hardware and/or software program code for determining, based on the scanning by the detection source 112, that at least one item 225 other than the first item 215 in the bagging area 250 or an area surrounding the POS device 110 includes a second security device 220 coupled to the at least one item 225 that has been deactivated but the at least one item 225 has not been scanned by the user at the POS device 110. The fraudulently deactivated security tag may be detected by the scanning by the detection source, due to the ability of the detection source emission to penetrate certain materials that commonly make up product packaging. For example, terra hertz radiation may be able to penetrate plastics, wood, packaging, paper, clear or opaque materials, and the like. The penetration of the radiation may reach the hidden, deactivated security device 220, which may reflect the radiation back towards the detection source 112. The reflected radiation may be captured by one or more sensors 113 positioned proximate the detection source 112. The sensors 113 may transmit data relating to the captured reflected radiation to the scanning module 133 for processing to determine whether a security device signature is detected. Similarly, lidar may be used to penetrate packaging and reach the hidden security device 220, which may reflect the puled laser back towards the detection source 112. The reflected laser wavelengths may be captured by the one or more sensors 113 positioned proximate the detection source 112. The sensors 113 may transmit data relating to the captured reflected laser wavelengths to the scanning module 133 for processing to determine whether a security device signature is detected.

In some embodiments, the security devices 210, 220 associated with the items 215, 225 (and other items having security devices) may be partially comprised of or include a detectable substance detectable by the detection source. For example, the security device may be manufactured to include a chemical component (such as a coating) that is detectable by the detection source 112.

Referring back to FIG. 1, embodiments of the computing system 120 may include a notification module 134. Embodiments of the notification module 134 may include one or more components of hardware and/or software program code for notifying an operator of the self-checkout lane that a fraudulently deactivated security device has been detected. For instance, embodiments of the notification module 134 may alert security, store representative, an operator or supervisor of a self-checkout lane that an item with a security device has been placed into a bagging area 250 without the item being scanned into the computer 110. The notification may be transmitted without alerting the current user. The notification may allow for corrective or preventive action to be taken while the user may still be unaware that the fraudulently deactivated security device has been detected.

In other embodiments, the notification module 134 may display a notice to the user that a deactivated security device has been detected. Notifying the user may be helpful in situations where the user accidentally deactivated two security devices at the same time without scanning each item. In an exemplary embodiment, the notification module 134 may suspend the checkout process on the POS device 110 until corrective action can be taken.

Accordingly, embodiments of the asset protection system 100 may be implemented to detect fraudulently deactivated security devices associated with items that a shoplifter does not intend to pay for, and in some cases, without the shoplifter being made aware that system 100 has detected the fraud. Further, using detection source(s) 112 to scan the items may be useful to detect lightweight objects that may not register on a weight scale traditionally utilized in the bagging area 250. In instances where the scale is not calibrated, the detection source 112 may be used as a counter measure for shoplifting, or may avoid the need to outfit the checkout location with a weight scale.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the asset protection system 100 may improve asset security technology, whereby utilizing multiple hardware devices are used to intelligently detect a deactive security device at the point of sale, rather than waiting until a shoplifter has reached the exit doors.

Figure 7:
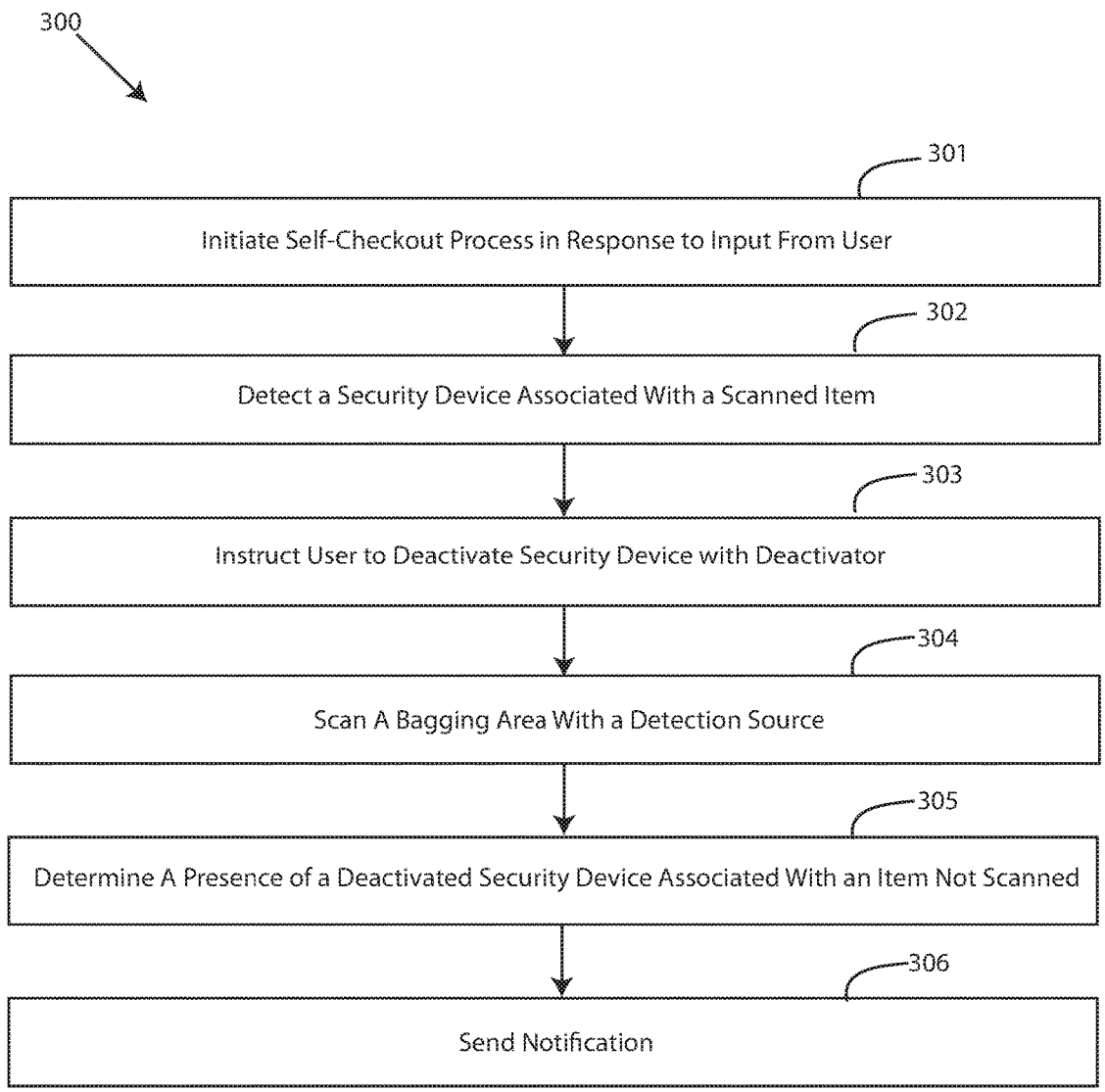
FIG. 7 depicts a flow chart of a method for asset protection, in accordance with embodiments of the present invention.

Referring now to FIG. 7, which depicts a flow chart of a method 300 for asset protection, in accordance with embodiments of the present invention. One embodiment of a method 300 or algorithm that may be implemented for asset protecting in accordance with the asset protection system 100 described in FIGS. 1-6 using one or more computer systems as defined generically in FIG. 9 below, and more specifically by the specific embodiments of FIG. 1.

Embodiments of the method 300 for asset protecting, in accordance with embodiments of the present invention, may begin at step 301 wherein a checkout process is initiated in response to an input by a user. For example, a user selecting a self-checkout option may result in the initiation of the self-checkout process. Step 302 detects a security device 210 associated with a scanned item 215. Step 303 instructs the user to deactivate the security device 210 by using the deactivator 111 proximate the POS device 110. Step 304 scans a location proximate the POS device 110 or the bagging area 250 using a detection source 112, such as terra hertz radiation or lidar. Step 305 determines a presence of a deactivated security device associated with an item not scanned by the scanner 110a. Step 306 sends a notification accordingly (e.g. to a supervisor, security, or to the user).

Figure 8:
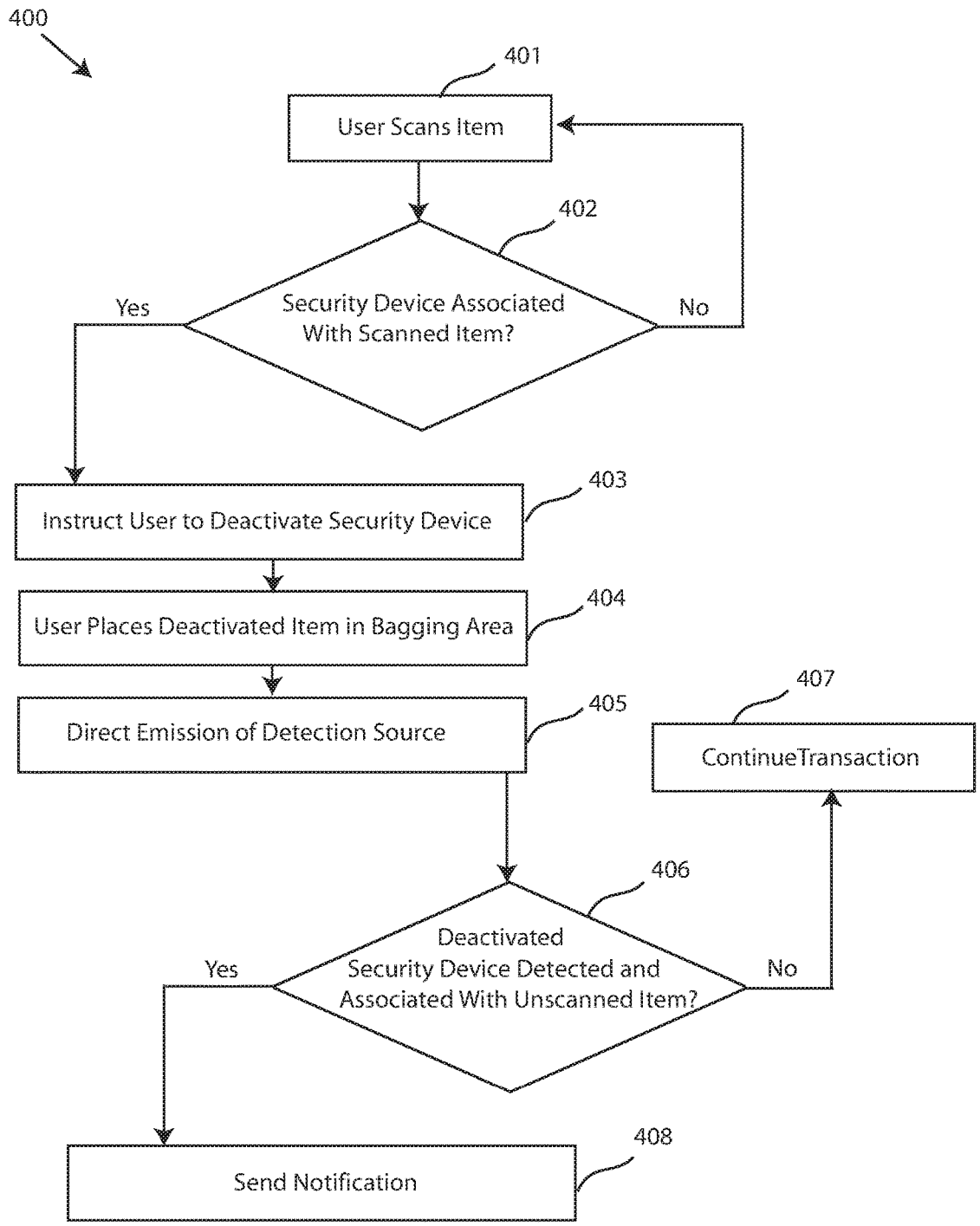
FIG. 8 depicts a detailed flow chart of an exemplary method of detecting a fraudulently deactivated security device, in accordance with embodiments of the present invention.

FIG. 8 depicts a detailed flow chart of an exemplary method 400 of detecting a fraudulently deactivated security device, in accordance with embodiments of the present invention. At step 401, a user scans an item. Step 402 determines whether the scanned item includes a security device that needs to be deactivated. If no, then method 400 returns to step 401. If yes, then step 403 instructs the user to deactivate the security device, using the deactivator located nearby. At step 404, the user places the item that was deactivated into a bagging area 250. Step 405 directs the detection source to emit terra hertz radiation or pulsed laser beams into the bagging area 250. Step 406 determines whether a deactivated security device is detected that is associated with an unscanned item. If no, then step 407 continues the checkout process. If yes, then step 408 send out a notification that a fraudulently deactivated security device has been detected (and potentially suspend the transaction).

Figure 9:
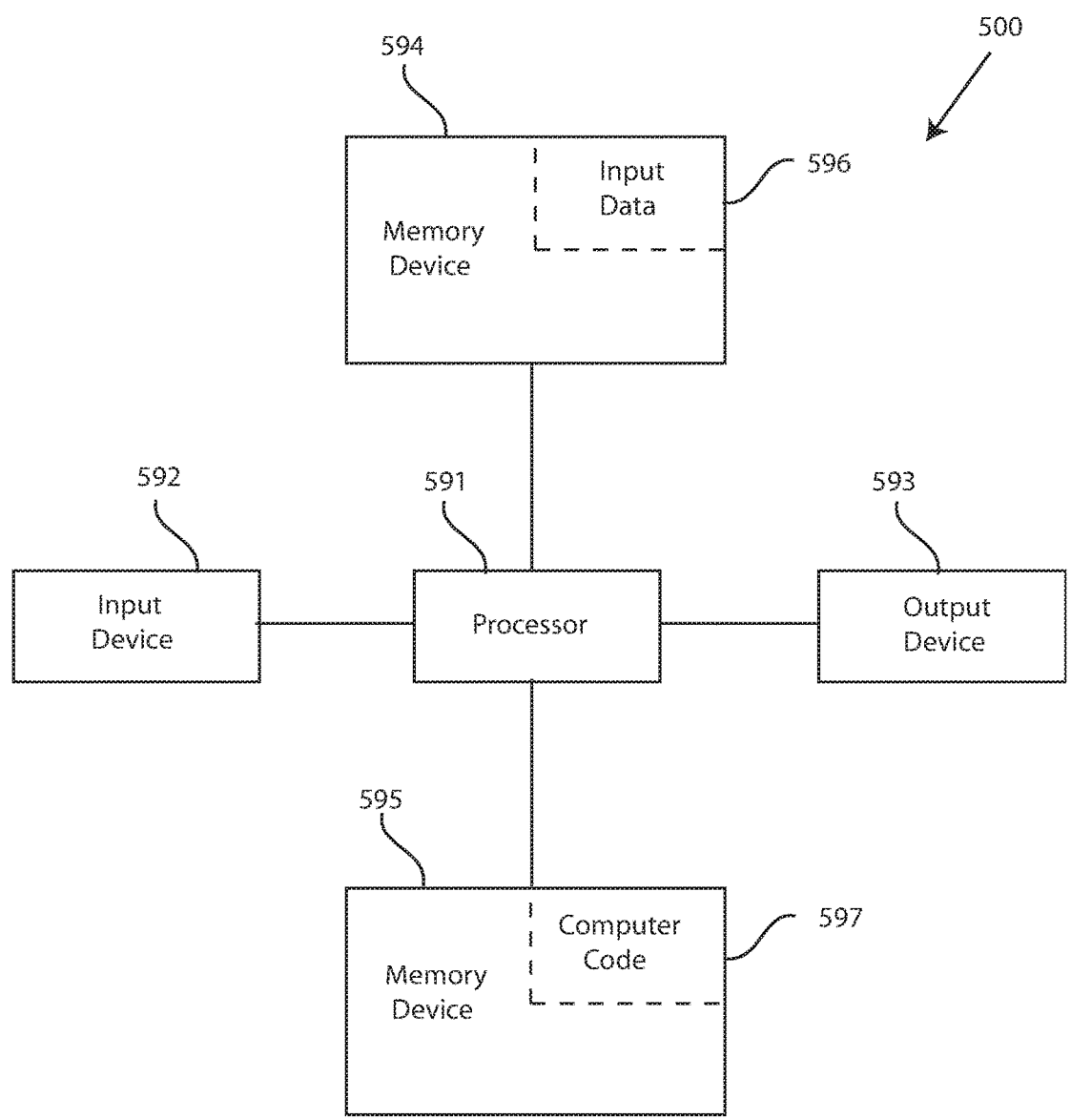
FIG. 9 illustrates a block diagram of a computer system for the asset protection system of FIGS. 1-6, capable of implementing methods for asset protection of FIGS. 7-8, in accordance with embodiments of the present invention.

FIG. 9 illustrates a block diagram of a computer system for the asset protection system of FIGS. 1-6, capable of implementing methods for asset protection of FIGS. 7-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for asset protection in the manner prescribed by the embodiments of FIGS. 7-8 using the asset protection system 100 of FIGS. 1-6, wherein the instructions of the computer code 597 may be executed by processor 591 via memory device 595. The computer code 597 may include software or program instructions that may implement one or more algorithms for implementing the methods for asset protection, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to asset protection systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to detect fraudulently deactivated security devices for asset protection. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for asset protection. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method asset protection.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

The invention claimed is:

1. A method for asset protection during self-checkout, comprising:
   initiating, by a processor of a computing system, a checkout process at a point of sale computer terminal, in response to an input by a user;
   detecting, by the processor, that a first item includes a first security device coupled to the first item, in response to the first item being scanned by the user at the point of sale computer terminal;
   instructing, by the processor, the user to deactivate the first security device and then place the first item into a bagging area, wherein a deactivator is located at the point of sale computer terminal to deactivate the first security device;
   directing, by the processor, a detection source to scan the bagging area after the first item and other items have been placed into the bagging area; and
   determining, by the processor, based on the scanning by the detection source, that a second security device coupled to an at least one item other than the first item in the bagging area has been deactivated, but the at least one item has not been scanned by the user at the point of sale computer terminal.

2. The method of claim 1, further comprising: notifying, by the processor, an operator that the second security device has been detected at the point of sale computer terminal, wherein the notifying is performed without alerting the user.

3. The method of claim 1, wherein the detection source is a lidar system or a terra hertz radiation device, disposed proximate the bagging area.

4. The method of claim 1, wherein potential fraud is detected at the point of sale computer terminal before the user reaches an anti-shoplifting security system proximate an exit door.

5. The method of claim 1, further comprising alerting, by the processor, the user that the at least one item needs to be scanned into the point of sale computer terminal, so that the user can take a corrective action.

6. The method of claim 1, wherein the at least one item is located inside a packaging of the first item, such that the deactivator deactivates both the first security device and the second security device during a deactivation of the first item, after scanning the first item.

7. The method of claim 1, wherein the detection source emits radiation that penetrates a packaging of the first item to detect a presence of the second security device.

8. The method of claim 1, further comprising, directing, by the processor, the detection source to scan an area surrounding the bagging area.

9. A system for asset protection during self-checkout, comprising:
   a processor;
   a detection source coupled to the processor; and
   a computer readable storage device coupled to the processor, wherein the storage device contains program code executable by the processor via the memory device to implement a method for asset protection during checkout, the method comprising:
      initiating, by a processor of a computing system, a checkout process at a point of sale computer terminal, in response to an input by a user;
      detecting, by the processor, that a first item includes a first security device coupled to the first item, in response to the first item being scanned by the user at the point of sale computer terminal;
      instructing, by the processor, the user to deactivate the first security device and then place the first item into a bagging area, wherein a deactivator is located at the point of sale computer terminal to deactivate the first security device;
      directing, by the processor, the detection source to scan the bagging area after the first item and other items have been placed into the bagging area; and
      determining, by the processor, based on the scanning by the detection source, that a second security device coupled to an at least one item other than the first item in the bagging area has been deactivated, but the at least one item has not been scanned by the user at the point of sale computer terminal.

10. The computer system of claim 9, further comprising: notifying, by the processor, an operator that the second security device has been detected at the point of sale computer terminal, wherein the notifying is performed without alerting the user.

11. The computer system of claim 9, wherein the detection source is a lidar system or a terra hertz radiation device, disposed proximate the bagging area.

12. The computer system of claim 9, wherein potential fraud is detected at the point of sale computer terminal before the user reaches an anti-shoplifting security system proximate an exit door.

13. The computer system of claim 9, further comprising alerting, by the processor, the user that the at least one item needs to be scanned into the point of sale computer terminal, so that the user can take a corrective action.

14. The computer system of claim 9, wherein the at least one item is located inside a packaging of the first item, such that the deactivator deactivates both the first security device and the second security device during a deactivation of the first item, after scanning the first item.

15. The computer system of claim 9, wherein the detection source emits radiation that penetrates a packaging of the first item to detect a presence of the second security device.

16. The computer system of claim 9, further comprising, directing, by the processor, the detection source to scan an area surrounding the bagging area.

17. A computer program product, comprising a computer readable hardware storage device storing a computer readable program code, the computer readable program code comprising an algorithm that when executed by a computer processor of a computing system implements a method for asset protection during checkout, the method comprising:
   initiating, by a processor of a computing system, a checkout process at a point of sale computer terminal, in response to an input by a user;
   detecting, by the processor, that a first item includes a first security device coupled to the first item, in response to the first item being scanned by the user at the point of sale computer terminal;
   instructing, by the processor, the user to deactivate the first security device and then place the first item into a bagging area, wherein a deactivator is located at the point of sale computer terminal to deactivate the first security device;
   directing, by the processor, a detection source to scan the bagging area after the first item and other items have been placed into the bagging area; and
   determining, by the processor, based on the scanning by the detection source, that a second security device coupled to an at least one item other than the first item in the bagging area has been deactivated, but the at least one item has not been scanned by the user at the point of sale computer terminal.

18. The computer program product of claim 17, further comprising: notifying, by the processor, an operator that the second security device has been detected at the point of sale computer terminal, wherein the notifying is performed without alerting the user.

19. The computer program product of claim 17, wherein the detection source is a lidar system or a terra hertz radiation device, disposed proximate the bagging area.

20. The computer program product of claim 17, wherein potential fraud is detected at the point of sale computer terminal before the user reaches an anti-shoplifting security system proximate an exit door.

21. The computer program product of claim 17, further comprising alerting, by the processor, the user that the at least one item needs to be scanned into the point of sale computer terminal, so that the user can take a corrective action.

22. The computer program product of claim 17, wherein the at least one item is located inside a packaging of the first item, such that the deactivator deactivates both the first security device and the second security device during a deactivation of the first item, after scanning the first item.

23. The computer program product of claim 17, wherein the detection source emits radiation that penetrates a packaging of the first item to detect a presence of the second security device.

24. The computer program product of claim 17, further comprising, directing, by the processor, the detection source to scan an area surrounding the bagging area.

* * * * *